United States Patent [19]

Nelson et al.

[11] Patent Number: 5,071,506

[45] Date of Patent: Dec. 10, 1991

[54] EQUIPMENT FOR MAKING COMPOSITE TUBES INCLUDING AN INFLATABLE HEATED BLADDER AND A COMPOSITE MOLD HAVING A NEGATIVE COEFFICIENT OF THERMAL EXPANSION

[75] Inventors: David R. Nelson, Logan; Dean C. Youngkeit, Willard, both of Utah

[73] Assignee: Thiokol Corporation, Ogden, Utah

[21] Appl. No.: 471,002

[22] Filed: Jan. 25, 1990

Related U.S. Application Data

[63] Continuation of Ser. No. 157,916, Feb. 19, 1988, abandoned, which is a continuation-in-part of Ser. No. 107,701, Oct. 9, 1987, abandoned.

[51] Int. Cl.⁵ .......................................... B65H 81/00
[52] U.S. Cl. ................................... 156/441; 156/156; 156/173; 156/175; 156/245; 156/433; 264/314; 425/387.1; 249/134
[58] Field of Search ............... 156/194, 173, 425, 156, 156/175, 169, 242, 433, 245, 441, 428–430, 285, 286; 249/134, 82, 152; 264/523, 572, 573, 574; 425/387.1

[56] References Cited

U.S. PATENT DOCUMENTS

| | | | |
|---|---|---|---|
| 2,794,481 | 6/1957 | Anderson | 156/194 X |
| 2,967,796 | 1/1961 | Raffel | 264/314 |
| 2,984,870 | 5/1961 | Warnken | 264/258 |
| 2,995,781 | 8/1961 | Sipler | 264/137 |
| 2,999,780 | 9/1961 | Perrault | 264/314 |
| 3,028,291 | 4/1962 | Roberts et al. | 156/194 X |
| 3,033,730 | 5/1962 | Martin . | |
| 3,037,244 | 6/1962 | Boggs | 264/314 |
| 3,156,598 | 10/1964 | Martin | 156/194 X |
| 3,257,690 | 6/1966 | Scott . | |
| 3,402,429 | 9/1968 | Davidson et al. . | |
| 3,629,030 | 12/1971 | Ash | 264/314 |
| 3,900,357 | 8/1975 | Huchette et al. | 264/263 |
| 3,937,781 | 2/1976 | Allen | 264/314 |
| 4,124,678 | 11/1978 | Stroupe | 264/314 |
| 4,126,659 | 11/1978 | Blad | 264/314 |
| 4,144,632 | 3/1979 | Stroupe | 264/314 |
| 4,202,856 | 5/1980 | Frikken et al. | 264/314 |
| 4,350,485 | 9/1982 | Larribe . | |
| 4,353,964 | 10/1982 | Grimm et al. | 264/258 |
| 4,389,269 | 6/1983 | Cooper et al. | 156/173 X |
| 4,552,329 | 11/1985 | Hattori et al. | 249/134 |
| 4,557,888 | 12/1985 | Rausing et al. | 264/314 |
| 4,659,624 | 4/1987 | Yeager et al. | 428/408 |
| 4,673,541 | 6/1987 | Watanabe et al. | 264/25 |
| 4,867,822 | 9/1989 | Bannink, Jr. | 156/165 X |

FOREIGN PATENT DOCUMENTS

| | | | |
|---|---|---|---|
| 2559066 | 8/1976 | Fed. Rep. of Germany | 249/134 |
| 3509634 | 5/1986 | Fed. Rep. of Germany . | |

OTHER PUBLICATIONS

English, L., "Fabricating the Future with Composite Materials", Materials Engineering, Jan., 1987, pp. 37–41.

Primary Examiner—Michael W. Ball
Assistant Examiner—Jeff H. Aftergut
Attorney, Agent, or Firm—James C. Simmons; Ronald L. Lyons

[57] ABSTRACT

A process and equipment for making seamless composite tubes. Composite material is applied on a mandrel which includes an inflatable bladder and inserted in a single piece mold. The bladder is pressurized for pressing the composite material against the mold wall for molding and curing thereof. In order to prevent seizing of the tube by the mold and thus allow easy removal of the cured tube, the mold is composed of a composite of resin impregnated carbon fiber material wherein the carbon fiber material has a negative coefficient of thermal expansion along the length thereof and is oriented at an angle of between about 15 and 40 degrees relative to a radial plane of the mold. In order to eliminate the use of inefficient and inconvenient cure ovens, a heat generating element is disposed internally of the mandrel for curing of the composite material.

15 Claims, 4 Drawing Sheets

EQUIPMENT FOR MAKING COMPOSITE TUBES INCLUDING AN INFLATABLE HEATED BLADDER AND A COMPOSITE MOLD HAVING A NEGATIVE COEFFICIENT OF THERMAL EXPANSION

This application is a continuation of application Ser. No. 07/157,916, filed Feb. 19, 1988, now abandoned; which is a continuation-in-part of application Ser. No. 07/107,701, filed Oct. 9, 1987 now abandoned.

The present invention relates generally to the manufacture of composite tubes, i.e., tubes such as, for example, struts for space station applications which are composed of a composite of fibrous material and a resin.

A composite tube may be conventionally made by winding fibrous material impregnated with a resin onto a mandrel and curing and molding the resulting composite material while it is on the mandrel, and the tube may include a layer of aluminum foil disposed about the outer surface of the composite material and co-cured therewith to act as an external protection coating to protect the composite from atomic oxygen erosion in the low earth orbit environment. Aluminum foil, which has high thermal conductivity, may also be provided to reduce the heat difference between the "sunny" side and "shady" side of the tube while it is in space. The use of a two-piece or split metal mold, i.e., one that opens longitudinally to permit removal of the composite material on the mandrel after it has cured, for molding the composite may result in a pair of cosmetically undesirable seams longitudinally of the resulting tube which seams may also damage the aluminum foil.

The use of the batch cure process wherein the composites in the molds are placed in a batch cure stand which is then placed in an oven for applying heat for curing thereof undesirably requires transportation of the composites to the oven and may also result in scheduling conflicts which may undesirably consume time. Furthermore, such an oven may be expensive to operate.

Long composite tubes, i.e., those over about 6 feet in length, may tend to sag, perhaps as much as 0.020 inch over 6 feet, if the mold is not sufficiently rigid or is not adequately supported over its length for curing.

A process wherein fibrous material is drawn through the space between two concentric aluminum tubes and is then impregnated with resin and cured and wherein portions of the aluminum tubes are then removed to achieve a desired aluminum protection thickness is an expensive and complicated process which does not lend itself to uniformity of tube manufacture.

A process wherein composite material wound onto a mandrel is inserted in what may be called a pipe autoclave wherein a bladder is provided internally of a pipe and air pressure is caused to force the bladder inwardly against the composite material for molding thereof as it is being cured would permit the manufacture of seamless tubes, but the problem of mandrel removal, because of the resulting tightness of the cured composite on the mandrel, would still remain. In addition, the acting of the bladder against the composite material to squeeze it may undesirably buckle hoop direction fibers, i.e., fibers which extend around the composite material at an angle of close to 0° relative to a radial plane thereof. As used in this specification and claims, the term "radial plane" is meant to refer to a plane which is perpendicular to the longitudinal axis of a composite tube being manufactured or a mandrel on which the tube is being manufactured.

It is accordingly an object of the present invention to provide an improved method and equipment for manufacture of composite tubes.

It is another object of the present invention to provide an improved method and equipment for making seamless composite tubes.

It is a further object of the present invention to provide a method of making composite tubes which is uniform, inexpensive, non-complicated, and reliable.

It is still another object of the present invention to provide such a process and equipment wherein the fibers in the composite are prevented from buckling during the molding and curing thereof.

It is yet another object of the present invention to provide such a process and equipment wherein an aluminum foil may be co-cured with the composite material without damage thereto.

It is another object of the present invention to provide such a process which does not require the use of an oven for curing of the composite material.

It is still another object of the present invention to improve the process flow of the tube fabrication process by eliminating the requirement of transportation of the composites to an oven so that curing may occur in the assembly area or otherwise as may be desired.

It is yet another object of the present invention to provide such a process wherein tube straightness is maintained during the curing of the tubes.

The above and other objects, features, and advantages of this invention will be apparent in the following detailed description of the preferred embodiments thereof which is to be read in connection with the accompanying drawings.

DETAILED DESCRIPTION OF THE PREFERRED EMBODIMENTS

Figure 1:
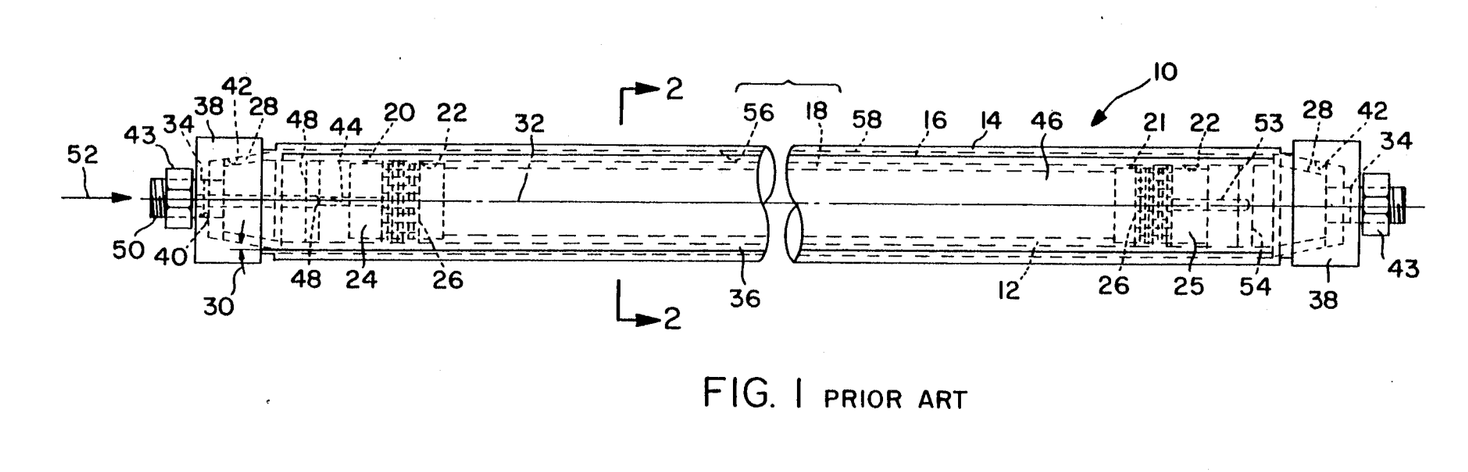
FIG. 1 is a side view of apparatus in accordance with the prior art.
Figure 2:
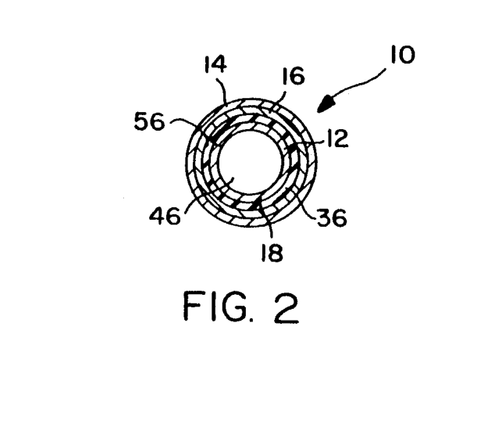
FIG. 2 is a sectional view of the apparatus of FIG. 1 taken along the line 2—2 thereof.
Figure 16:
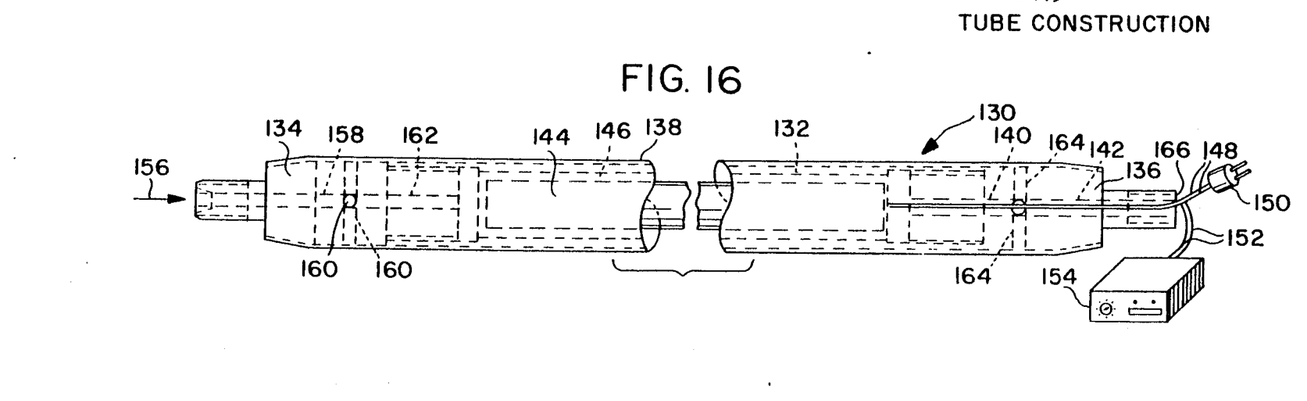
FIG. 16 is a side view of a mandrel which embodies the present invention.

Referring to FIGS. 1 and 2, there is shown generally at 10 apparatus, in accordance with the prior art, including a mandrel 12 and an elongate cylindrical mold 14 for making a composite tube illustrated at 16. A mandrel in accordance with the present invention is shown in FIG. 16 and will be discussed hereinafter.

The mandrel 12 includes an elongate cylindrical pipe 18 which may be composed of steel or other suitable material and which is sized in accordance with principles commonly known to those of ordinary skill in the art to which this invention pertains for the particular length and diameter of tube 16 desired. The end portions 20 and 21 of the pipe 18 have internal threads 22 for threadedly inserting an end plug 24 and 25 respectively having threads 26 thereon. When secured in the pipe 18, each end plug 24 and 25, which may be composed of steel or other suitable material, extends axially outwardly beyond the respective end of the pipe 18 to a portion 28 which tapers radially inwardly at a small angle illustrated at 30 of perhaps between about 5 and 15 degrees relative to the axis 32 of the pipe 18. As used in this specification and the claims, the term "axial" or "axially" is meant to refer to direction parallel to the axis 32 of mandrel 12 which is also the axis of a composite tube 16 built thereon. The term "radial" or "radially" is meant to refer to a direction normal to the axis 32. The tapered end portion 28 terminates in a reduced diameter fitting 34.

Surroundingly engaging the pipe 18 and the tapered end portions 28 is an elongate generally cylindrical bladder 36 composed of a suitable elastomeric material which is expandable as air pressure or other suitable fluid pressure is applied as will be described hereinafter. In order that the bladder 36 may be easily released from the composite tube 16 after it is cured for removal of the mandrel 12 as well as to provide good toughness and heat capabilities to the bladder, it is preferably composed of silicone rubber. An end cap 38, which has an aperture 40 in which the end fitting 34 is inserted, is internally tapered as shown by tapered radially enlarged opening 42 into which aperture 40 opens, to have substantially the same taper 30 that end plug portion 28 has to fit over the tapered portion 28 and pinch the respective end of the bladder 36 between the tapered internal surface 42 of the end cap 38 and the tapered portion 28 to seal the bladder 36 to the respective end plug at each end 20 and 21 so that air pressure may be applied between the pipe 18 and bladder 36 for expansion of the bladder 36. The end cap 38 is urged onto tapered portion 28 and secured thereon by nut 43 which is threadedly engaged to end fitting 34.

At one end portion 20, the respective end plug 24, tapered portion 28, and end fitting 34 have an aperture or passageway 44 which extends axially therethrough for passage of air pressure from an air pressure supply, illustrated at 52, into the pipe space 46. Intermediate the tapered portion 28 and the threads 22, branch passages 48 which communicate with passage 44 extend radially outwardly from passage 44 and open into a space between the radially outer surface of the end plug 24 and the bladder 36 to provide air pressure between the bladder 36 and the end plug 24 and pipe 18 for expansion of the bladder 36 so that the composite material 16 may be forced or pressed against the mold 14 for molding thereof while it is curing. The end plug 24 terminates in a threaded end 50 to which is attached air pressure supply 52.

The other end plug 25 has an aperture or passageway 53 which extends axially through the threaded portion 26 thereof and to a point intermediate the pipe internal threads 22 and the tapered portion 28 thereof at which point communicating passageways 54 extend radially from passageway 53 to the radially outer surface of the end plug 25 to open into tne space between the end plug 25 and bladder 36 to provide air pressure supplied from supply 52 via pipe space 46 between the bladder 36 and the end plug 25 and pipe 18 so that: uniform distribution of air pressure at both end portions 20 and 21 of the pipe may be provided. Thus, the application of air pressure 52 through passageway 44 to pipe space 46 and into passageway 53 and into branch passageways 48 and 54 at their respective pipe end portions 20 and 21 is provided to provide uniformity of application of air pressure to the bladder for expansion thereof while the end caps 38 pinch the bladder ends against the tapered portions 28 to seal the bladder against escape of air pressure.

With the tube composite material 16 applied onto the mandrel 12, it is inserted in opening 56 of female mold 14 for molding and curing thereof. By "female mold" is meant a mold having a longitudinally extending opening for receipt of material to be molded. The composite material for tube 16 may be a resin impregnated fiber material which is suitably applied such as, for example, by tube rolling as will be described hereinafter with the bladder 36 in its relaxed position, i.e., with no air pressure applied.

The particular resin which may be used for both the mold 14 and the tube 16 will vary depending upon such variables as the desired characteristics, the price, and quality. The resin, which may be either natural or synthetic, is preferably an epoxide which shrinks less and therefore has a lesser tendency to warp. Where high impact resistance is desired, a thermoplastic resin such as, for example, a phenolic resin is preferred. For space strut tubes and other applications where a high quality product is required, it is preferred that the epoxide be a high temperature cure and performance epoxide, i.e., one which has a glassy transition temperature greater than about 400° F. such as, for example, Araldite My 720 or 721 epoxide manufactured by Ciba Geigy, and more preferably mixed with bismaleimide. An epoxy marketed by Amoco Performance Products, Inc. of Itasca, Ill., under the designation 1908B has also been found to perform well. Where the term "resin" is used in this specification and the claims, it is meant to refer also to other suitable matrix materials such as a suitable ceramic or a suitable metallic in which fibrous material may be embedded.

In order to facilitate removal of tube 16, after it is cured, from mold 14 and from the mandrel 12 while maintaining a high quality surface finish with substantially no voids (less than about 1% voids), a suitable teflon-based release film such as, for example, FEP (fluorinated ethylene propylene) release film manufactured by du Pont De Nemours & Co. is applied to the tube surfaces.

In order to provide an external protection coating to protect the tube from atomic oxygen erosion in a low earth orbit environment as well as to provide high thermal conductivity to reduce the heat difference between the "sunny" side and the "shady" side of the tube as it is in space, a foil of aluminum, illustrated at 58, is applied to the outer surface of the composite material 16 in a single layer with slight overlapping to be co-cured with the composite material 16 to thus save time and expense in applying the foil 58. A release film however is not applied either on the inside or on the outside of the aluminum foil 58. If desired, a suitable adhesive may be applied between the aluminum foil 58 and the composite material 16 although the resin in the composite material 16 may provide some adhesive capability. The adhesive may be pre-plied to the foil 58 or it may be in sheet form to be plied onto the composite material 16. The application of metallic foils other than aluminum foil may be desirable depending on the desired tube characteristics.

If the mold were of the expensive and difficult to build split metal or two-piece type which opens along longitudinal seams 180 degrees apart for inserting the composite material and removing the cured tube, the foil may be weakened or otherwise undesirably damaged at the resulting seams. Such seams may also be cosmetically undesirable. Therefore, in order to make a seamless tube in accordance with the present invention, the mold 14, as shown in FIG. 2, is of a single piece type, that is, the mold does not open along any longitudinal seam but composite material to be molded is insertable therein and removable therefrom without opening thereof.

Figure 3:
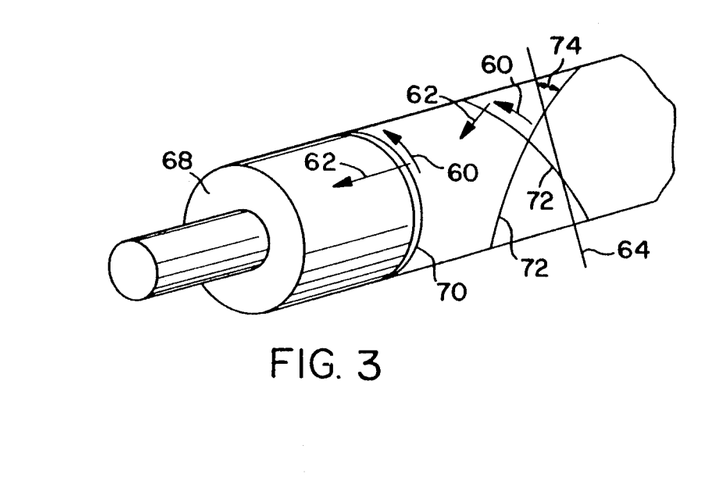
FIG. 3 is a schematic view which illustrates the manufacture of a mold which embodies the present invention and which illustrates the angles of the plies of resin impregnated fibrous material therein.
Figures 13, 14, 15:
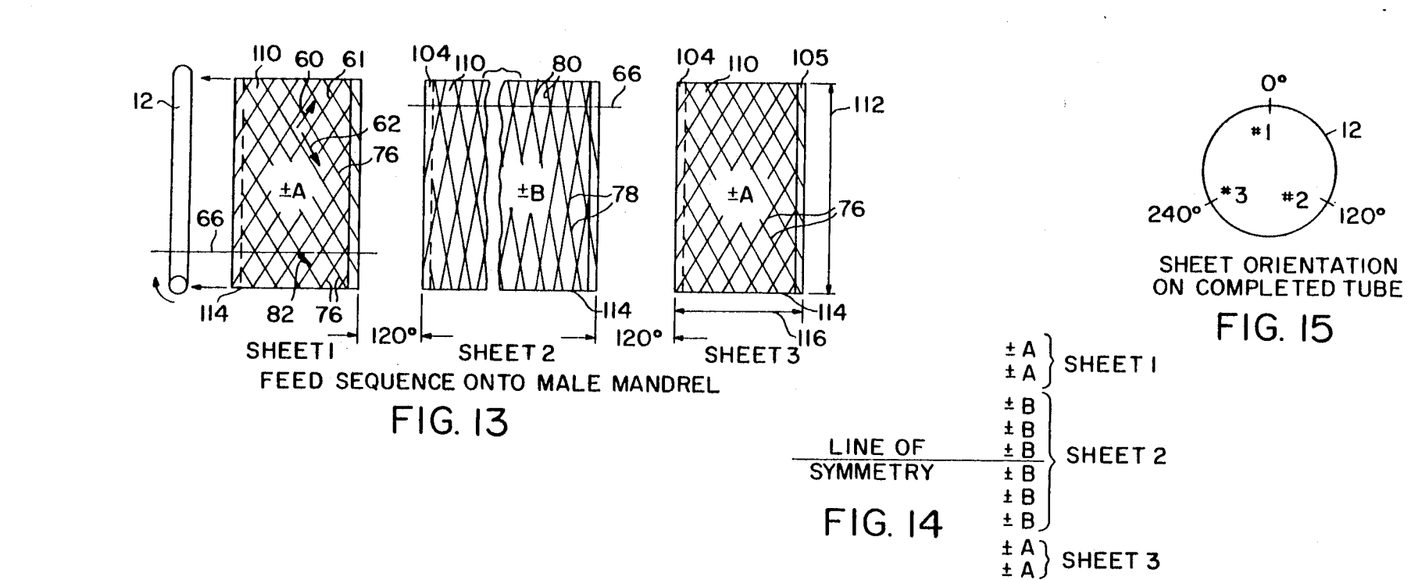
FIG. 13 is a schematic view illustrating the feed sequence of sheets of resin impregnated fibrous material onto a mandrel to make a composite tube in accordance with the present invention.
FIG. 14 is a diagrammatic view of the sheets of FIG. 13 as laid onto the mandrel thereof.
FIG. 15 is a diagrammatic view illustrating sheet orientation of the sheets of FIG. 13 in a completed tube.
Figure 17:
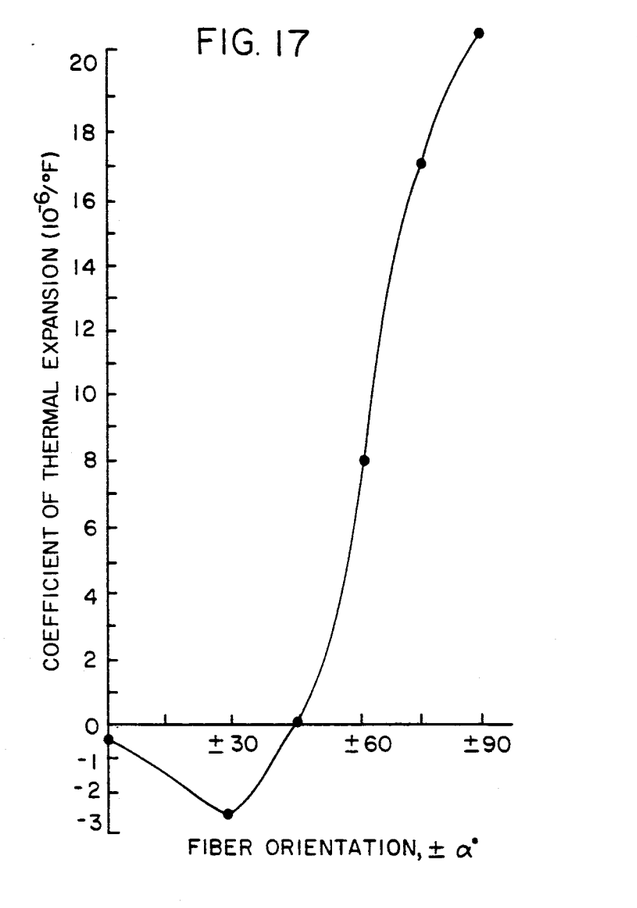
FIG. 17 is a graph of the coefficient of thermal expansion of a graphite/epoxy laminate at different fiber orientations.

After the mandrel 12 containing the composite material 16 is inserted into the single piece mold 14, the bladder 36 is pressurized by the application of air pressure 52 as previously discussed to expand the bladder to press the composite material 16 outwardly against the inner surface 56 of the mold 14 for curing and molding thereof. For a typical space application, it may be desirable that the tube 16 be composed of a composite of carbon fibers and resin. The opening of a conventional metal mold would expand during cure and the carbon fiber tube would be molded to that expanded state because of the pressure applied by the bladder. After cooldown, the metal mold opening would then contract to its normal size, and the carbon or graphite, because of its thermal stability, will not contract as much upon cooldown. Therefore, if a single piece metal mold is used, the metal may become locked onto the cured carbon or graphite composite tube by an interference fit and could not be removed without damage to the tube or mold. In order to provide a single piece mold in accordance with the present invention wherein the tube 16 can be easily removed after curing and wherein the mold can be built inexpensively, the mold 14 is composed of a composite of carbon or graphite (each of which is hereinafter called "carbon") fibrous material impregnated with a suitable resin. Carbon fibrous material, usually at a modulus of elasticity greater than about 40 msi (million pounds per square inch), will exhibit a negative coefficient of thermal expansion in the longitudinal direction, illustrated at 60 in FIGS. 3 and 13 for fiber strands 70 and 61 respectively, of the fiber while it will continue to exhibit a positive coefficient of thermal expansion across the grain or transverse to the longitudinal direction, as illustrated at 62 for fiber strands 70 and 61 respectively in FIGS. 3 and 13. FIG. 17 shows the coefficient of thermal expansion at various fiber orientations, i.e., angle 74 in FIG. 3, for a graphite/epoxy laminate. Though the graph for various types of carbon materials may vary slightly, the graph in FIG. 17 is typical. Though carbon fibers have a negative coefficient of thermal expansion along the lengths thereof, in a carbon composite tubular member, such as mold 14, a poissoning effect results, as shown in FIG. 17, in the greatest negative coefficient of thermal expansion of the mold when the fibers are oriented at an angle relative to a radial plane of about 30 degrees and only a slight negative coefficient of thermal expansion for hoop direction fibers. Thus, referring to FIG. 3, FIG. 17 shows that a composite mold wherein the carbon fibers are oriented at an angle of less than about 45 degrees relative to a radial plane, illustrated at 64, will tend to contract as the mold is being heated so that the opening 56 becomes smaller in diameter and will tend to expand so that the opening 56 becomes larger in diameter during cooldown. If the composite tube 16 has carbon fibers which, as illustrated in FIG. 13, extend generally longitudinally thereof so that the angle between the carbon fibers and a radial plane, illustrated at 66, is greater than about 45 degrees, then the composite material 16 will tend to expand radially outwardly as it is heated and contract radially inwardly as it is cooled. In such a case, depending on wall thickness and fiber orientation, the mold aperture diameter may increase by perhaps 0.0005 to 0.001 inch while the tube outer diameter may decrease by perhaps 0.001 to 0.005 inch during cooldown to thus allow clearance for easy removal of the cured tube 16. Of course, as the fiber orientation of the tube 16 becomes less longitudinal and/or the fiber orientation of the mold 14 is changed from a preferred angle 74 of about 30 degrees, this clearance will be lessened. In addition, if the fibrous material of the tube 16 has a positive coefficient of thermal expansion, then cooldown of the tube 16 may also tend to effect a decrease in diameter thereof to further aid in removal of the tube from the mold 14. Therefore, referring to FIG. 3, a mold 14 is made in accordance with the present invention by filament winding or otherwise suitably applying onto a polished steel mandrel 68 filaments of carbon fiber impregnated with a suitable resin. In order not to have fiber crossovers which may result in voids and thereby may result in bumps in the inner surface 56 of the mold 14, the initial or inner plys, perhaps for example the first two plys, may be laid onto the mandrel 68 with the fibers, illustrated at 70 in FIG. 3, oriented in the hoop direction, i.e., at an angle of substantially 0 degrees, i.e., less than about 5 degrees, relative to the radial plane 64. In order to achieve a high negative coefficient of thermal expansion in the mold 14 as well as to provide some strength axially to prevent breakage during handling, the remaining plies are preferably helically wound over the initial plies so that the carbon fibers, illustrated at 72, are oriented at an angle, illustrated at 74, which is preferably between about 15 and 40 degrees, more preferably between about 25 and 35 degrees such as, for example, 30 degrees. This angle 74 should be selected to provide sufficient strength axially while also allowing expansion rather than contraction radially of the mold 14 during cooldown for removal of the tube 16 therefrom, and can be selected using principles commonly know to those of ordinary skill in the art to which this invention pertains. Helical winding is a filament winding process wherein the angle 74 is sufficiently small that the winding remains on the cylindrical surface of the mandrel 68 and is laid thereon in a helical fashion commonly known to those of ordinary skill in the art to which this invention pertains. After the resin impregnated carbon fiber material 70 and 72 has been applied to the steel mandrel 68, it may then be cured by heating thereof typically at a temperature of about 200° F. for about 4 hours, then at a temperature of about 350° F. for about 3 hours, then allowed to cool. During cooldown, the fibers 70 and 72 will lengthen while the steel mandrel 68 shrinks so that the mandrel 68 may be removed easily therefrom.

The use of the previously referred to Amoco 1908B epoxy flows sufficiently well to avoid the formation of voids and resulting bumps in the inner surface 56 of the mold 14. The hoop windings 60 may tend to delaminate during use of the mold 14. In order to provide a more durable wear surface 56 for a stronger mold, the hoop windings 60 may be eliminated, as shown by their absence in FIG. 18, and the Amoco 1908B epoxy used.

Referring to FIG. 13, in order to provide for easy removal of the tube 16 from the mold 14 as well as to satisfy various physical characteristics required for such tubes in space, the resin impregnated carbon fiber filaments 76 and 78 for the tube 16 extend at an angle 82 and 80 respectively relative to a radial plane 66 which is preferably greater than about 45 degrees, more preferably greater than about 60 degrees. For example, fibers 76 may extend at an angle 82 of about 60° degrees while fibers 78 may extend at an angle 80 of about 80° degrees, thus providing a high positive coefficient of thermal expansion as shown in FIG. 17.

Figure 4:
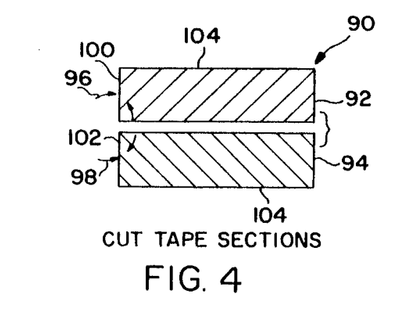
FIGS. 4 to 12 are schematic views which illustrate successively a process of making a composite tube in accordance with the present invention.

Referring to FIGS. 4 to 12, a step by step process for preparing a tube 16 in accordance with a preferred embodiment of the present invention is illustrated therein. As illustrated in FIG. 4, the process is initiated by preparing the composite material, illustrated at 90, for application about the mandrel 12. Although the tube 16 may, if desired, be filament wound, in order to save time and cost and provide a high quality tube which does not erode easily, in accordance with a preferred embodiment of the present invention the material is prepared as one or more pairs of transverse tape sections 92 and 94 having fiber strands oriented at opposed angles 96 and 98 respectively relative to the side 100 and 102 respectively which sides 100 and 102 are to extend circumferentially about the mandrel 12 and which therefore represent a radial plane of the tube 16 to be prepared. As discussed in copending application Ser. No. 006,411, filed Jan. 23, 1987 (docket no. 1368-22-00) which application is assigned to the assignee of the present application and which is incorporated herein by reference, transverse tape, of which tape sections 92 and 94 are composed, refers to strips of unwoven, unknitted, and unstitched resin impregnated fiber strand portions wherein the resin rather than stitching holds the fibers together so that the fibrous material may be adequately debulked and excessive pockets which may cause the resulting tube to otherwise erode easily may be eliminated.

Figure 5:
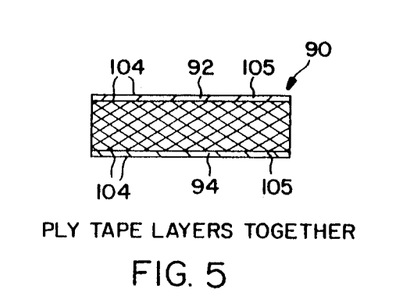

As illustrated in FIG. 5, each pair of cut tape sections 92 and 94 is plied together with leading and lagging edges 104 preferably offset as illustrated by offsetting portions 105 in order to form a smoother tube 16.

Figure 6:
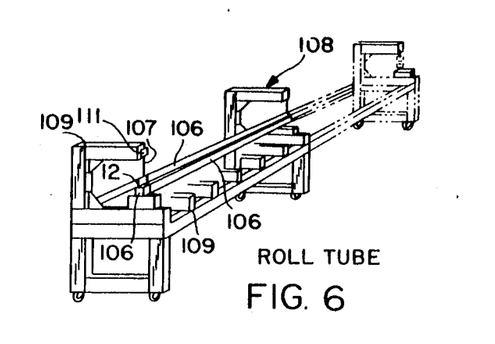

After the one or more pairs of plied tape layers have been prepared, they are rolled onto the mandrel 12 in an apparatus illustrated at 108 in FIG. 6 which is similar to the apparatus illustrated in FIG. 6 of the aforesaid application Ser. No. 006,411. The mandrel 12 is inserted between 3 compaction rollers 106 at least one of which is a drive roller and which are positioned in circumferentially spaced relation about the circumference of the mandrel 12. A plurality of perhaps seven rams, schematically illustrated at 107, powered by air cylinders 111 mounted on support members 109 are spaced over the length of apparatus 108 to provide adjustable pressure on the rollers 106 for application of compaction force on the plied tape layers on the mandrel 12. The cylinders 111 are linked together by a common manifold (not shown) to provide uniformity of compaction force. The rams may be retracted and the top roller 106 may be lifted away from the mandrel 12 so that it may be quickly replaced by another mandrel so that efficient mass production of the tubes 16 may be achieved. A suitable drive means (not shown) is provided to drive one of the rollers 106 to roll the material 90 onto the mandrel 12 as it is fed between the rollers 106 and the mandrel 12. Alternatively, an apparatus similar to that illustrated in FIG. 6 of the aforesaid application Ser. No. 006,411 may be used.

Referring to FIGS. 13 to 15, the resin impregnated composite material 90 may be prepared as one or more sheets 110 of plied tape layers having a length illustrated at 112 which is substantially equal to or longer than the tube 16 to be formed and whose sides 114, corresponding to sides 100 and 102 in FIG. 4, have a length, illustrated at 116, which is substantially a multiple of the circumference of the mandrel 12. For example, it may be desired, as illustrated in FIG. 14, that the inner surface of the tube 16 have two plies of resin impregnated fibrous material 90 wherein the fibers extend at an angle of $\pm A$ followed by six plies where the fibers extend at an angle of $\pm B$ which is followed by two plies where the fibers again extend at an angle of $\pm A$. In order to achieve such a tube construction, referring back to FIG. 13, sheet 1 is prepared having fiber angle $\pm A$ and which has a side 114 which has a length 116 which is equal to substantially twice the circumference of the mandrel 12 so that it may be rolled about the mandrel 12 to provide the two layers of fibrous material wherein the angle of the fibers is $\pm A$. Sheet 2 has a side 114 the length 116 of which is substantially six times the circumference of the mandrel 12 in order to provide the six layers wherein the fibers extend at the angle of $\pm B$. Lastly, sheet 3, which is similar to sheet 1, is prepared to provide two layers wherein the fibers extend at an angle of $\pm A$. The sheets 110 of transverse tape are applied to the mandrel 12 in tube rolling apparatus 108 by first rolling sheet 1 onto the mandrel 12, then sheet 2, then sheet 3.

As illustrated in FIG. 15, the sheets 110 are preferably applied in a staggered relation wherein the sides 114 are oriented at different locations of the tube circumference. For example, sheet no. 1 may be applied to the mandrel 12 such that its ends are located at a 0 degree position. Sheet no. 2 may then be applied so that its ends are located at a position which is 120° away on the mandrel. Sheet no. 3 may then be rolled onto the mandrel 12 so that ends are located at a position which is at a relative angle 240°. Thus, after sheet 1 is applied to the mandrel 12, it is rotated 120°, as illustrated in FIG. 13, before sheet 2 is applied, and after sheet 2 is applied, the mandrel 12 is rotated another 120° before sheet 3 is applied. However, it should be understood that the specific procedures for applying the composite material 90 shown in FIGS. 13 to 15 are for illustrative purposes, and various other procedures for application of the material 90 may be utilized for a desired tube construction in accordance with principles commonly known to those of ordinary skill in the art to which this invention pertains, and such other procedures are meant to come within the scope of the present invention.

The specific angles A and B of the fiber orientation in the sheets 110 may be selected using principles commonly known to those of ordinary skill in the art to which this invention pertains and are based on such criteria as axial stiffness (resistance to axial compression and tensile loads), buckling, handling damage tolerance, and hoop strength. A typical tube 16 may have a diameter of 2 inches and a thickness, which may be based on the amount of stiffness required and other design requirements, which may be between about 0.040 and 0.10 inches which corresponds to 8 to 20 ply layers 92 and 94 at a typical thickness of 5 mils per ply. The tube construction shown in FIGS. 13 to 15 has 20 ply layers to thus have a thickness of typically 0.10 inch.

Figure 7:
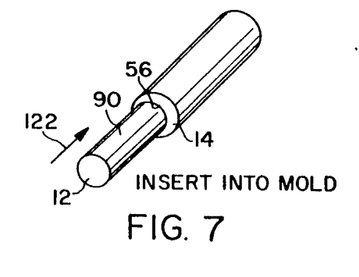

Referring to FIG. 7, after the composite material 90 has been applied to the mandrel 12, it is then inserted, as illustrated at 122, into the female carbon mold 14.

In order to achieve easy insertion of the composite material 90 into the mold 14, the diameter of the uncured composite material 90 on the mandrel is preferably selected to be about 0.02 to 0.06 inch less than the diameter of the aperture 56 of the mold 14 in which the composite material 90 is inserted for molding and curing thereof. After insertion of the composite material 90 into the mold 14, the bladder 36 is expanded by application of air pressure 52 as previously discussed to force the composite material 90 against the inside wall of the mold 14 for molding thereof. Thus, the diameter of the composite material 90 will increase by about 0.02 to 0.06 inch prior to being cured. In order to achieve an appropriate bladder inflation, an air pressure 52 of about 100 psi may typically be applied against the bladder.

Figure 8:
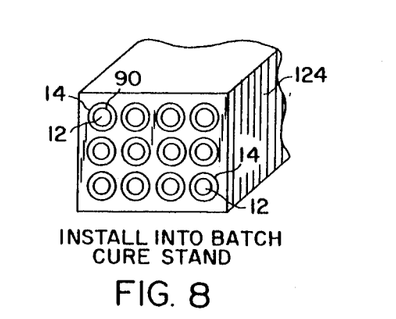
Figure 9:
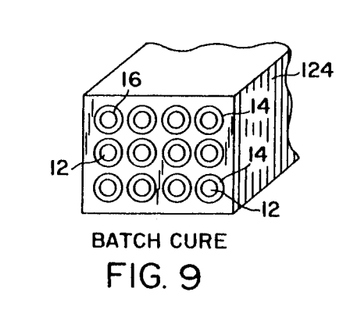

Referring to FIGS. 8 and 9, the composite material 90 in the mold 14 is cured by any suitable process. For example, it may be cured by installing it along with other composites into a batch cure stand illustrated at 124, which is then placed in a cure oven (not shown), and a suitable amount of heat for a suitable period of time is applied thereto for curing of the composite material. For example, after the entire mass of composite material 90 has been heated to about 350° F., which may typically take about 2 hours, the composite material may then be cured for typically 2 hours at a temperature of 350° F. During the curing process, the fibers 70 and 72 in the carbon mold 14 will shorten due to their negative coefficient of thermal expansion to cause the mold aperture 56 to decrease slightly in diameter, typically by about 0.0005 to 0.001 inch.

Unlike a pipe autoclave wherein composite material to be cured is inserted in a bladder which may press inwardly against the composite material to cause buckling of the fibers in the hoop direction, the carbon mold 14 of the present invention is substantially fixed in size (the decrease in diameter being only less than about 0.001 inch as previously discussed), and the distance which the composite material is forced outwardly initially by the pressurized bladder 36 acts to insure against buckling of the hoop direction fibers and may even straighten them out because the tube 16, when cured, is at a greater diameter, as previously discussed, than when it is rolled prior to curing.

Figure 10:
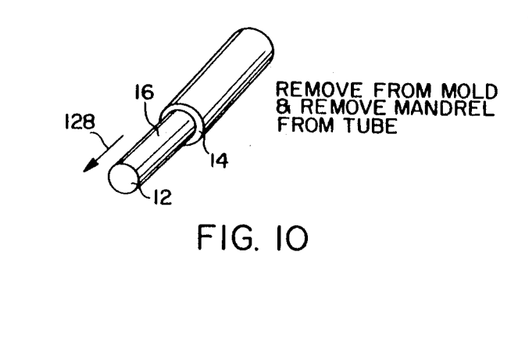

Referring to FIG. 10, after the tube 16 has been cured, it and the mold 14 are removed from the cure oven and allowed to cool to ambient temperature before removal of the tube from the mold. The cooling of the mold 14 allows the carbon fibers 70 and 72, having a negative coefficient of thermal expansion, therein to lengthen so that the mold diameter 56 does not decrease while the tube diameter decreases, as previously discussed, for easy removal, as illustrated at 128, of the cured tube 16 therefrom.

Figure 11:
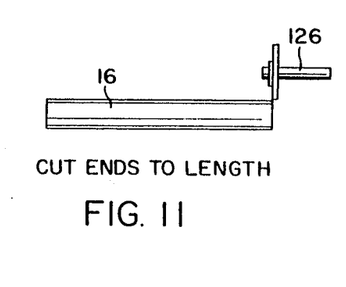
Figure 12:
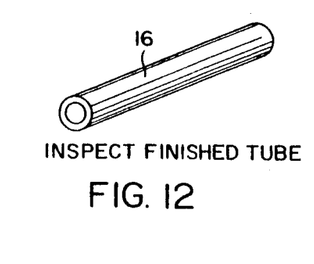

Referring to FIGS. 11 and 12, after the tube 16 has been removed from the mold 14 and the mandrel 12 removed from the tube 16, the tube may be cut to the desired length using a suitable cutting tool illustrated at 126, and the finished tube 16 may then be inspected as necessary. During the curing and molding process, the overlap of the aluminum foil 58 may show up as a bump on the inside surface of the tube 16 and thus not show up on the outside surface of the tube.

While the use of a batch cure stand 124, insertable in a cure oven (not shown), as illustrated in FIGS. 8 and 9, is generally satisfactory, an oven may constitute an inefficient use of thermal energy and may therefore be expensive to operate. A cure oven also undesirably requires transportation of the composites thereto for curing rather than allowing curing in the assembly area or as may be desired. In addition, there may be scheduling conflicts with the cure oven which may result in undesirable delays. Referring to FIG. 16, there is shown a mandrel in accordance with the present invention. The mandrel, which is generally shown at 130, includes a pipe 132, end plugs 134 and 136 including air passages 158 and 162, 160, 140, and 164, and an expandable bladder 138 which are similar to the pipe 18, end plugs 24 and 25 including air passages 44, 48, 53, and 54, and expandable bladder 36 respectively of FIG. 1. Extending axially outwardly from air passage 140 in end plug 136 to open axially outwardly of the end plug 136 is a passageway 142 for electric wires. In order to provide a more efficient means for curing the composite material 90 as well as to provide improved process flow of the tube fabrication process and eliminate scheduling conflicts that may arise from the use of a cure oven in accordance with the present invention, curing means which comprises an electric heating element 144 is provided in the pipe space 146. The heating element 144 is connected to a source of electric energy such as electric wires 148 which extend therefrom through passageways 140 and 142 to plug 150. The curing temperature is regulated by thermocouple means which includes suitably positioned thermocouples (not shown) connected to thermocouple wires illustrated at 152 which are connected to a suitable temperature recorder and controller apparatus 154. Air pressure illustrated at 156 is applied through passageway 158 and branch passages 160 to pressurize the bladder 138 and through passageway 162 into the pipe space 146 then into passageway 140 in end plug 136 and through branch passages 164 to also pressurize the bladder 138 similarly for the passage of air pressure 52 in FIG. 1. In order to prevent the escape of air pressure through passageway 142, it is suitably sealed such as by seal 166.

Figure 18:
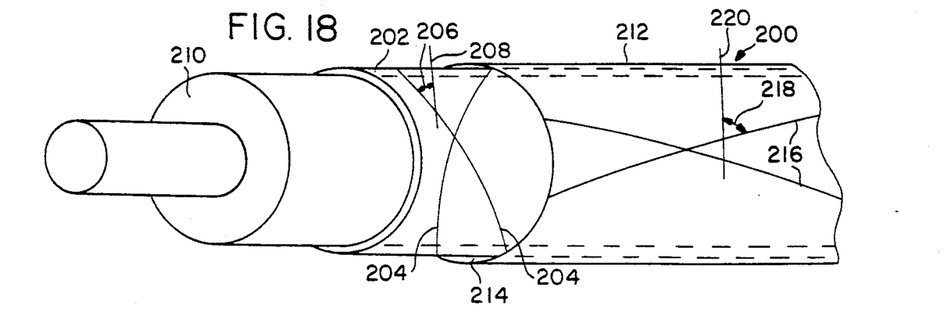
FIG. 18 is a schematic view of an alternative embodiment of the apparatus of the present invention.

Referring to FIG. 18, there is illustrated the process of making a mold 200 in accordance with an alternative embodiment of the present invention. The mold 200 includes an inner cylindrical composite member 202 which may be similar to mold 14 of FIG. 3. Member 202 is made by helically winding about a suitable metallic mandrel 210 carbon fibers 204 similar to carbon fibers 72 at an angle 206 relative to radial plane 208 which angle 206 is similar to angle 74 in FIG. 3. The fibrous material 204 is impregnated with a suitable resin. Unlike FIG. 3, in order to provide a more durable wear inner surface, the mold member 202 of FIG. 18 does not contain a layer of hoop windings, and the previously discussed Amoco 1908B epoxide or other suitable epoxide which flows sufficiently to result in little or no voids is used.

Because the mold 200 may be insufficiently rigid because of the low filament winding angle 206, composite tubes over about 6 feet in length may tend to sag, perhaps as much as 0.020 inch over 6 feet, during curing while in the carbon composite mold 200 if not adequately supported over their length for curing.

In order to prevent excessive sagging of the tubes while in the mold during curing in accordance with the alternative embodiment of the present invention, there is provided a rigid tubular member in which the mold member 202 is inserted but is unbonded thereto so that the mold member 202 will be unaffected thereby. While the rigid tubular member may be composed of steel or other rigid material, it is preferably composed of a member 212 of carbon composite material which snugly fits but is not otherwise attached to mold member 202 and has a thickness in the range of perhaps 0.02 to 0.06 inch to provide sufficient rigidity to prevent excessive sagging of the tubes during curing. The mold may have a thickness in the range of 0.1 to 0.15 inch.

A suitable teflon-based release film 214 such as the previously discussed FEP release fiber is applied to the outer surface of the mold member 202 for winding of member 212 thereabout. In order to provide a clearance of about 0.002 to 0.004 inch between members 202 and 212 as well as to consolidate the composite material of member 202, a teflon shrink tape is preferably applied to member 202 prior to cure thereof and is left thereon after mold 200 has been made. After the mold member 202 has been cured, the rigid tubular member 212 is wound thereon by filament winding carbon filamentary material inpregnated in a suitable resin thereon at an angle illustrated at 218 relative to a radial plane 220 of greater than about 60 degrees, such as, for example, about 80 degrees, suitable for providing the desired stiffness therein whereby the amount of tube sagging may be reduced to perhaps less than 0.005 inch over 6 feet.

It is to be understood that the invention is by no means limited to the specific embodiments which have been illustrated and described herein, and that various modifications thereof may indeed be made which come within the scope of the present invention as defined by the appended claims.

What is claimed is:

1. Apparatus for making a seamless composite tube comprises a mold which includes an elongate single piece carbon fiber and resin composite and aperture means extending longitudinally through said composite for insertion of a mandrel on which resin impregnated fibrous material may be applied for curing and molding thereof, a mandrel which includes an elongate cylindrical body having a pair of end portions and cavity means internally thereof and intermediate said end portions and insertable in said aperture means for curing and molding of resin impregnated fibrous material applied thereon, means comprising an electrical heating element disposed in said cavity means and electrical wires for supplying electrical energy to said heating element for generating heat for curing resin impregnated fibrous material applied on the mandrel, a radially outer surface on said body, bladder means disposed about said radially outer surface and responsive to pressurizing thereof for pressing a resin impregnated fibrous material which is applied thereon outwardly against said aperture means for molding of the resin impregnated fibrous material, passage means in each of said end portions for applying air pressure for pressurizing said bladder means, air pressure inlet means in one of said mandrel end portions, said passage means being in flow communication with said cavity means whereby said cavity means allows the passage of air pressure between said passage means in both said end portions, means in the other of said mandrel end portions for routing said electrical wires into said cavity means for connection to said heating element, and means for sealing said routing means against escape of air pressure from said cavity means, said single piece composite including carbon fibrous material which has a negative coefficient of thermal expansion and the fibers thereof are oriented at an angle which is between about 15 and 40 degrees relative to a radial plane of the mold.

2. Apparatus according to claim 1 further comprises rigid means including a cylindrical member disposed about said single piece composite in closely surrounding relation for maintaining straightness of the single piece composite.

3. Apparatus according to claim 2 wherein said cylindrical member is composed of a composite of cured resin impregnated carbon fibrous material wherein the fibers thereof are oriented at an angle which is greater than about 60 degrees relative to a radial plane of the mold.

4. Apparatus according to claim 3 wherein the fibers of said carbon fibrous material of said single piece composite are oriented at an angle which is between about 25 and 35 degrees relative to a radial plane of the mold.

5. Apparatus according to claim 1 wherein the fibers of said carbon fibrous material of said single piece composite are oriented at an angle which is between about 25 and 35 degrees relative to a radial plane of the mold.

6. Apparatus according to claim 1 wherein the fibers of said carbon fibrous material of said single piece composite are oriented at an angle of about 30 degrees relative to a radial plane of the mold.

7. Apparatus according to claim 1 wherein said bladder means is composed of silicone rubber.

8. Apparatus for making a seamless composite tube comprises a mold which includes an elongate single piece carbon fiber and resin composite and aperture means extending longitudinally through said composite for insertion of a mandrel on which resin impregnated fibrous material may be applied for curing and molding thereof, a mandrel which includes an elongate cylindrical body having a pair of end portions and cavity means internally thereof and intermediate said end portions and insertable in said aperture means for curing and molding of resin impregnated fibrous material applied thereon, means comprising an electrical heating element disposed in said cavity means and electrical wires for supplying electrical energy to said heating element for generating heat for curing resin impregnated fibrous material applied on the mandrel, a radially outer surface on said body, bladder means disposed about said radially outer surface and responsive to pressurizing thereof for pressing a resin impregnated fibrous material which is applied thereon outwardly against said aperture means for molding of the resin impregnated fibrous material, passage means in each of said end portions for applying air pressure for pressurizing said bladder means, air pressure inlet means in one of said mandrel end portions, said passage means being in flow communication with said cavity means whereby said cavity means allows the passage of air pressure between said passage means in both said end portions, means in the other of said mandrel end portions for routing said electrical wires into said cavity means for connection to said heating element, means for sealing said routing means against escape of air pressure from said cavity means, and rigid means including a cylindrical member disposed about said single piece composite in closely surrounding relation for maintaining straightness of the single piece composite.

9. Apparatus according to claim 8 wherein said bladder means is composed of silicone rubber.

10. Apparatus for making a seamless composite tube comprises a mold which includes an elongate single piece carbon fiber and resin composite and aperture means extending longitudinally through said composite for insertion of a mandrel on which resin impregnated fibrous material may be applied for curing and molding thereof, a mandrel which includes an elongate cylindrical body having a pair of end portions and cavity means internally thereof and intermediate said end portions and insertable in said aperture means for curing and molding of resin impregnated fibrous material applied thereon, means comprising an electrical heating element disposed in said cavity means and electrical wires for supplying electrical energy to said heating element for generating heat for curing resin impregnated fibrous material applied on the mandrel, a radially outer surface on said body, bladder means disposed about said radially outer surface and responsive to pressurizing thereof for pressing a resin impregnated fibrous material which is applied thereon outwardly against said aperture means for molding of the resin impregnated fibrous material, passage means in each of said end portions for applying air pressure for pressurizing said bladder means, air pressure inlet means in one of said mandrel end portions, said passage means being in flow communication with said cavity means whereby said cavity means allows the passage of air pressure between said passage means in both said end portions, means in the other of said mandrel end portions for routing said electrical wires into said cavity means for connection to said heating element, means for sealing said routing means against escape of air pressure from said cavity means, and rigid means including a cylindrical member disposed about said single piece composite in closely surrounding relation for maintaining straightness of the single piece composite, said cylindrical member is composed of a composite of cured resin impregnated carbon fibrous material wherein the fibers thereof are oriented at an angle which is greater than about 60 degrees relative to a radial plane of the mold.

11. Apparatus according to claim 10 wherein said bladder means is composed of silicone rubber.

12. A mandrel for making a composite tube comprises an elongate cylindrical body having a pair of end portions and a cavity means internally thereof and intermediate said end portions and further having a radially outer surface, bladder means disposed about said radially outer surface and responsive to pressurizing thereof for pressing a resin impregnated fibrous material which is applied thereon outwardly against an inner wall of a female mold in which the mandrel and applied resin impregnated fibrous material is inserted for molding thereof, means comprising an electrical heating element disposed in said cylindrical body cavity means and electrical wires for supplying electrical energy to said heating element for generating heat for curing resin impregnated fibrous material applied on the mandrel, passage means in each of said end portions for applying air pressure for pressurizing said bladder means, air pressure inlet means in one of said mandrel end portions, said passage means being in flow communication with said cavity means whereby said cavity means allows the passage of air pressure between said passage means in both said end portions, means in the other of said mandrel end portions for routing said electrical wires into said cavity means for connection to said heating element, and means for sealing said routing means against escape of air pressure from said cavity means.

13. A mandrel according to claim 12 wherein said bladder means is composed of silicone rubber.

14. Apparatus for making a seamless composite tube comprises a mold which includes an elongate single piece carbon fiber and resin composite and aperture means extending longitudinally through said composite for insertion of a mandrel on which resin impregnated fibrous material may be applied for curing and molding thereof, a mandrel which includes an elongate cylindrical body having a pair of end portions and cavity means internally thereof and intermediate said end portions and insertable in said aperture means for curing and molding of resin impregnated fibrous material applied thereon, means comprising an electrical heating element disposed in said cavity means and electrical wires for supplying electrical energy to said heating element for generating heat for curing resin impregnated fibrous material applied on the mandrel, a radially outer surface on said body, bladder means disposed about said radially outer surface and responsive to pressurizing thereof for pressing a resin impregnated fibrous material which is applied thereon outwardly against said aperture means for molding of the resin impregnated fibrous material, passage means in each of said end portions for applying air pressure for pressurizing said bladder means, air pressure inlet means in one of said mandrel end portions, said passage means being in flow communication with said cavity means whereby said cavity means allows the passage of air pressure between said passage means in both said end portions, means in the other of said mandrel end portions for routing said electrical wires into said cavity means for connection to said heating element, and means for sealing said routing means against escape of air pressure from said cavity means.

15. Apparatus according to claim 14 wherein said bladder means is composed of silicone rubber.

* * * * *